United States Patent Office 3,117,128
Patented Jan. 7, 1964

3,117,128
LOWER ALKYL-1-[CYANO-(POLYCARBON-LOWER ALKYL)]-4-PHENYL - PIPERIDINE - 4 - CARBOXYLATES
Aram Mooradian, Nassau, N.Y., assignor to Sterling Drug Inc., New York, N.Y., a corporation of Delaware
No Drawing. Filed Apr. 30, 1958, Ser. No. 731,897
5 Claims. (Cl. 260—294.3)

This invention relates to composition of matter of the class of substituted piperidines and to processes for their preparation.

The invention here resides in the concept of a composition having the molecular structure in which a carbamyl-(polycarbon-lower-alkyl) radical is attached to the nitrogen atom of the piperidine ring of lower-alkyl 4-phenylpiperidine-4-carboxylates where the carbamyl nitrogen atom can be substituted by from one to two radicals selected from the group consisting of lower-alkyl and lower-aryl radicals, and in a process for physically embodying such concept.

Among the compounds of my invention are those which in free base form have the structural Formula I

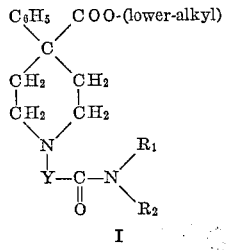

I where Y represents a polycarbon-lower-alkylene radical having its connecting linkages to the ring nitrogen and carbamyl radical on different carbon atoms, and $R_1$ and $R_2$ represent hydrogen, lower-alkyl or lower-aryl radicals.

The physical embodiments of my invention have been tested by standard pharmacological evaluation procedures in cats and found to possess antitussive activity. A subgeneric group of the compositions within my generic concept, i.e., those substances wherein the carbamyl nitrogen atom is substituted by at least one lower-aryl radical or by two lower-alkyl radicals, have analgesic activity, as determined by standard pharmacological evaluation procedures in rats.

The term "low-alkyl," as used herein, means alkyl radicals having from one to six carbon atoms, inclusive, and is illustrated by methyl, ethyl, n-propyl, isopropyl, n-butyl, isobutyl, 2-butyl, n-amyl, n-hexyl, and the like.

The term "polycarbon-lower-alkylene," as used herein, means alkylene radicals having from two to six carbon atoms, inclusive, and is illustrated by —$CH_2CH_2$—, —$CH(CH_3)CH_2$—,

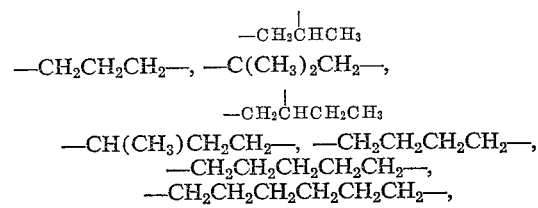

and the like.

The term "low-aryl," as used herein, means radicals having one or two aromatic rings each having five or six ring-atoms which are carbocyclic or heterocyclic, as illustrated by phenyl, naphthyl, biphenylyl, pyridyl, pyrimidyl, furyl, thiazolyl, and the like. Preferred embodiments when $R_1$ and $R_2$ are both lower-aromatic radicals or when one of $R_1$ or $R_2$ is a lower-aromatic radical and the other is hydrogen or a lower-alkyl radical are compounds of the above Formula I where $R_1$ or $R_2$ is a monocarbocyclic aryl radical having six ring-carbon atoms, that is, an aryl radical of the benzene series. These embodiments, which are preferred primarily because of their commercial practicability due to availability of intermediates, include compounds were $R_1$ or $R_2$ is the unsubstituted phenyl radical and phenyl radicals substituted by substituents such as lower-alkyl, lower-alkoxy, lower-alkylmercapto, lower-alkylsulfonyl, halo, lower-alkylamino, amino, lower-carboxylic-acylamino, and the like. The substituted-phenyl radicals have preferably from one to three substituents which can be in any of the available positions of the phenyl nucleus, and where more than one substituent is present, they can be the same or different and they can be in any of the various position combinations relative to each other. The lower-alkyl, lower-alkoxy, lower-alkylmercapto, lower-alkylsulfonyl, lower-alkylamino, lower-carboxylic-acylamino, and the like substituents have preferably from one to six carbon atoms which can be arranged as straight or branched chains, and are illustrated by methyl, ethyl, n-hexyl, methoxy, isobutoxy, ethylmercapto, n-amylmercapto, isopropylsulfonyl, n-butylsulfonyl, ethylamino, n-butylamino, acetylamino, propionylamino, and the like.

The lower-alkyl 1-[carbamyl-(polycarbon-lower-alkyl)]-4-phenylpiperidine-4-carboxylates are prepared by reacting the corresponding lower-alkyl 4-phenylpiperidine-4-carboxylate with a carbamyl-(polycarbon-lower-alkylating) agent. For the preparation of the compounds where the polycarbon-lower-alkylene radical (designated above as Y) has its connecting linkages on adjacent carbon atoms, that is, an alpha,beta-lower-alkylene radical, the preferred carbamyl-(polycarbon-lower-alkylating) agent is an acrylamide having the formula $$C(R)_2\!=\!C(R)CONR_1R_2$$

where $R_1$ and $R_2$ have the meanings designated hereinabove and R represents hydrogen or a lower-alkyl radical. For example, the reaction of ethyl 4-phenylpiperidine-4-carboxylate with acrylamide ($R\!=\!R_1\!=\!R_2\!=\!$hydrogen), methacrylamide 2 - methyl - 2 - propenamide) or N-methyl-N-phenylacrylamide ($R\!=\!$hydrogen, $R_1\!=\!$methyl, $R_2\!=\!$phenyl) yields, respectively, ethyl 1-(2-carbamylethyl)-4-phenylpiperidine-4-carboxylate, ethyl 1-(2-carbamylpropyl)-4-phenylpiperidine-4-carboxylate or ethyl 1-[2-(N - methyl - N - phenylcarbamyl)ethyl] - 4 - phenylpiperidine-4-carboxylate. The reaction is generally carried out at a temperature between about 50° C. and 150° C., preferably by heating on a steam bath, either without or with an inert solvent, e.g., tertiary-butanol.

Alternatively, the compounds of my invention can be prepared by using as the carbamyl-(polycarbon-lower-alkylating) agent a carbamyl-(polycarbon-lower-alkyl) halide having the formula X—Y—$CONR_1R_2$ where Y, $R_1$ and $R_2$ have the meanings designated hereinabove and X is a halo radical, preferably chloro, bromo or iodo. As an illustration of this procedure, ethyl 1-(4-carbamylbutyl)-4-phenylpiperidine-4-carboxylate is formed by reacting ethyl 4-phenylpiperidine-4-carboxylate with 4-carbamylbutyl chloride, bromide or iodide. As above, this reaction is preferably run by heating the reactants, with or without an appropriate solvent inert under the reaction conditions, at a temperature between about 50° C. and 150° C.

An alternative procedure for the preparation of the compounds of Formula I where $R_1$ and $R_2$ represent hydrogen consists of first reacting a lower-alkyl 4-phenylpiperidine-4-carboxylate with a cyanoalkyl halide having the formula X—Y—CN where X and Y have the meanings given above and then hydrolyzing the resulting lower-alkyl 1-(cyanoalkyl) - 4 - phenylpiperidine-4-carboxylate under acidic conditions to yield the corresponding 1-(carbamylalkyl) compound. Illustrative of this procedure is the reaction of ethyl 4-phenylpiperidine-4-carboxylate with 5-cyanopentyl bromide to form ethyl 1-(5-cyanopentyl)-4-phenylpiperidine-4-carboxylate which is then hydrolyzed by treatment with concentrated sulfuric acid at room temperature to yield ethyl 1-(5-carbamylpentyl)-4-phenylpiperidine-4-carboxylate.

My lower-alkyl 1-[carbamyl-(polycarbon-lower-alkyl)]-4-phenylpiperidine-4-carboxylates are useful in the free base form or in the form of acid-addition salts; and both forms are within the purview of the invention, and, in fact, are considered to be one and the same invention. The acid-addition salts are simply a more convenient form for use; and, in practice, use of the salt form inherently amounts to use of the base form. As used in the appended claims, unless specifically designated otherwise, the term "lower - alkyl 1 -[- carbamyl - (polycarbon-lower-alkyl)]-4-phenylpiperidine-4-carboxylate" means both the free base form and the acid-addition salt form of the molecular structure recited. The acids which can be used to prepare the acid-addition salts are preferably those which produce, when combined with the free base, pharmacologically acceptable salts, that is, salts whose anions are relatively innocuous to the animal organism in pharmacological doses of the salts, so that the beneficial physiological properties inherent in the free base are not vitiated by side effects ascribable to the anions; in other words, the latter do not substantially affect the pharmacological properties inherent in the cations. In practicing my invention, I found it convenient to form the hydrochloride salt. However, other appropriate pharmacologically acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate and quinate, respectively.

The acid-addition salts are prepared either by dissolving the free base in aqueous solution containing the appropriate acid and isolating the salt by evaporating the solution, or by reacting the free base and acid in an organic solvent, in which case the salt separates directly or can be obtained by concentration of the solution.

Although pharmacologically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a pharmacologically acceptable salt by ion exchange procedures.

Another aspect of my invention resides in the intermediate lower-alkyl 1-[cyano-(polycarbon-lower-alkyl)]-4-phenylpiperidine-4-carboxylates in the form of their free bases and their acid-addition salts. Among the compounds of this aspect of my invention are those which in free base form have the structural Formula II

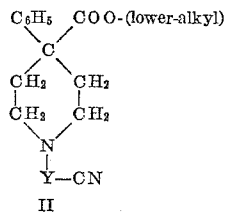

II where Y is a polycarbon-lower-alkylene radical as defined and illustrated hereinabove. These compounds can be prepared as described above by the reaction of a lower-alkyl 4-phenylpiperidine-4-carboxylate with a cyanoalkyl halide of the formula X—Y—CN; alternatively, the compounds where Y is an alpha,beta-alkylene radical can be prepared by reacting a lower-alkyl 4-phenylpiperidine-4-carboxylate with an acrylonitrile having the formula $C(R)_2=C(R)CN$ where R represents hydrogen or lower-alkyl as defined hereinabove. Also within the purview of this aspect of the invention are acid-addition salts of the above 1-(cyanoalkyl) intermediates including salts like those defined and illustrated above for the corresponding 1-(carbamylalkyl) compounds. As used in the appended claims, unless specifically designated otherwise, the term "lower-alkyl 1-[cyano-(polycarbon-lower-alkyl)]-4-phenylpiperidine-4-carboxylate" means both the free base form and the acid-addition salt form of the molecular structure recited.

The molecular structures of the compounds of my invention are established by their mode of synthesis and corroborated by the correspondence of calculated and found values for the elementary analyses for representative examples.

The following examples will further illustrate the invention without, however, limiting it thereto.

EXAMPLE 1

*Ethyl 1-(2-Carbamylethyl)-4-Phenylpiperidine-4-Carboxylate Hydrochloride*

A 26.9 g. portion of ethyl 4-phenylpiperidine-4-carboxylate hydrochloride was covered with ether and the mixture shaken well with 45 cc. of 10% aqueous sodium hydroxide solution. To the ether layer containing ethyl 4-phenylpiperidine-4-carboxylate was added 7.1 g. of acrylamide. The resulting mixture was heated on a steam bath in vacuo to remove the ether and then heating on a steam bath was continued for about one hour at which time the reaction mixture solidified. The solid was dissolved in about 300 cc. of hot isopropyl alcohol; and the resulting solution was filtered and made acidic with gaseous hydrogen chloride. The solution was cooled and treated with a small quantity of ether whereupon there separated a crystalline material which was collected, washed with ether and dried. There was thus obtained 26.5 g. of ethyl 1-(2-carbamylethyl)-4-phenylpiperidine-4-carboxylate hydrochloride, M.P. 179.8–182.7° C. (corr.).

*Aanalysis.*—Calcd. for $C_{17}H_{24}N_2O_3 \cdot HCl$: Cl⁻, 10.40; N, 8.22. Found: Cl⁻, 10.49; N, 8.29.

Following the above procedure using hydrobromic acid, sulfamic acid, citric acid or methanesulfonic acid in place of hydrogen chloride, there is obtained, respectively, ethyl 1-(2-carbamylethyl)-4-phenylpiperidine-4-carboxylate hydrobromide, ethyl 1-(2-carbamylethyl)-4-phenylpiperidine-4-carboxylate sulfamate, ethyl 1-(2-carbamylethyl)-4-phenylpiperidine-4-carboxylate citrate or ethyl 1-(2-carbamylethyl)-4-phenylpiperidine-4 - carboxylate methanesulfonate.

The reaction of ethyl 4-phenylpiperidine-4-carboxylate with acrylamide was also carried out using tertiary-butanol as a reaction solvent, as follows: Ethyl 4-phenylpiperidine-4-carboxylate (from 26.9 g. of its hydrochloride) dissolved in 200 cc. of ether was added to 7.0 g. of acrylamide dissolved in 200 cc. of tertiary-butanol. The solution was heated on a steam bath first to remove the ether and then heating on a steam bath was continued for an additional three hours. Decolorizing charcoal was added to the hot reaction solution, the resulting mixture filtered and the filtrate cooled. The precipitate which separated was collected and recrystallized several times from isopropyl alcohol to yield 20 g. of ethyl 1-(2-carbamylethyl)-4-phenylpiperidine-4-carboxylate, M.P. 159.4–160.8° C. (corr.).

*Analysis.*—Calcd. for $C_{17}H_{24}N_2O_3$: N, 9.20; C, 67.09; H, 7.95. Found: N, 9.19; C, 67.43; H, 7.90.

Pharmacological evaluation of ethyl 1-(2-carbamylethyl)-4-phenylpiperidine-4-carboxylate hydrochloride in aqueous solution administered intraperitoneally to anesthetized cats subjected to mechanical stimulation according to know procedures to induce coughing has shown that this compound is approximately as effective an antitussive agent as codeine. This compound was found to have an acute toxicity ($LD_{50}$) in mice of 90±6.0 mg. per kg. when administered intravenously in aqueous solution.

EXAMPLE 2

*1-[2-(N,N-Dimethylcarbamyl)Ethyl]-4-Phenylpiperidine-4-Carboxylate Hydrochloride*

This preparation was carried out following the procedure described in Example 1 using ethyl 4-phenylpiperidine-4-carboxylate (from 26.9 g. of the corresponding hydrochloride), N,N-dimethylacrylamide and a heating period of three hours on a steam bath. There was thus obtained 1-[2-(N,N-dimethylcarbamyl)ethyl]-4-phenylpiperidine-4-carboxylate hydrochloride, M.P. 181.8–183.4° C. (corr.).

*Analysis.*—Calcd. for $C_{19}H_{28}N_2O_3 \cdot HCl$: $Cl^-$, 9.61; N, 7.60. Found: $Cl^-$, 9.62; N, 7.53.

Pharmacological evaluation of 1-[2-(N,N-dimethylcarbamyl)ethyl]-4-phenylpiperidine-4-carboxylate hydrochloride for antitussive activity by the method described above in Example 1 has shown that this compound is approximately four times as effective an antitussive agent as codeine. In addition, pharmacological evaluation of this compound in aqueous solution administered subcutaneously by the Rat Thermal Stimulus Method of Bass and Vander Brook has shown that this compound is approximately seven times as active an analgesic as meperidine hydrochloride. This compound was found to have an acute toxicity ($LD_{50}$) in mice of 14.0±1.2 mg. per kg. when administered intravenously in aqueous solution.

EXAMPLE 3

*Ethyl 1-[2-(N-Ethylcarbamyl)Ethyl]-4-Phenylpiperidine-4-Carboxylate Hydrochloride*

This compound was prepared following the procedure described in Example 1 using ethyl 4-phenylpiperidine-4-carboxylate (from 26.9 g. of its hydrochloride salt) and 10.0 g. of N-ethylacrylamide. There was thus obtained ethyl 1-[2-(N-ethylcarbamyl)ethyl]-4-phenylpiperidine-4-carboxylate hydrochloride, M.P. 188.4–190.0° C. (corr.).

*Analysis.*—Calcd. for $C_{19}H_{28}N_2O_3 \cdot HCl$: $Cl^-$, 9.61; N, 7.60. Found: $Cl^-$, 9.60; N, 7.47.

Pharmacological evaluation of ethyl 1-[2-(N-ethylcarbamyl)ethyl]-4-phenylpiperidine-4-carboxylate hydrochloride for antitussive activity when determined as described in Example 1 has shown that this compound is approximately as effective an antitussive agent as codeine.

EXAMPLE 4

*Ethyl 1-[2-(N-Phenylcarbamyl)Ethyl]-4-Phenylpiperidine-4-Carboxylate Hydrochloride*

Following the procedure described in Example 1 using ethyl 4-phenylpiperidine-4-carboxylate (from 15 g. of its hydrochloride) and 8.2 g. of N-phenylacrylamide, there was obtained 20 g. of ethyl 1-[2-(phenylcarbamyl)ethyl]-4-phenylpiperidine-4-carboxylate hydrochloride, M.P. 204.6–208.4° C. (corr.) when recrystallized from isopropyl alcohol.

*Analysis.*—Calcd. for $C_{23}H_{28}N_2O_3 \cdot HCl$: $Cl^-$, 8.51; N, 6.72. Found: $Cl^-$, 8.40; N, 6.40.

Pharmacological evaluation of ethyl 1-[2-(N-phenylcarbamyl)ethyl]-4-phenylpiperidine-4-carboxylate hydrochloride by the method described in Example 1 has shown that this compound is approximately as effective an antitussive agent as codeine. Ethyl 1-[2-(N-phenylcarbamyl)ethyl]-4-phenylpiperidine-4-carboxylate hydrochloride when tested in aqueous solution administered intraperitoneally by the Rat Thermal Stimulus Method of Bass and Vander Brook was found to be approximately as active an analgesic as meperidine hydrochloride.

EXAMPLE 5

*Ethyl 1-[2-(N,N-Diethylcarbamyl)Ethyl]-4-Phenylpiperidine-4-Carboxylate Hydrochloride*

Following the procedure described in Example 1 using ethyl 4-phenylpiperidine-4-carboxylate (from 26.9 g. of the hydrochloride) and 14.3 g. of N,N-diethylacrylamide, there was obtained 36.2 g. of ethyl 1-[2-(N,N-diethylcarbamyl)ethyl]-4-phenylpiperidine-4-carboxylate hydrochloride, M.P. 171.0–173.6° C. (corr.).

*Analysis.*—Calcd. for $C_{21}H_{32}N_2O_3 \cdot HCl$: $Cl^-$, 8.93; N, 7.06. Found: $Cl^-$, 8.92; N, 6.98.

Ethyl 1-[2-(N,N-diethylcarbamyl)ethyl]-4-phenylpiperidine-4-carboxylate hydrochloride when tested according to the procedure described in Example 1 was found to be approximately four times as effective an antitussive agent as codeine. Also, pharmacological evaluation of ethyl 1-[2-(N,N-diethylcarbamyl)ethyl]-4-phenylpiperidine-4-carboxylate hydrochloride in aqueous solution administered subcutaneously by the Rat Thermal Stimulus Method of Bass and Vander Brook has shown that this compound is approximately three times as active an analgesic as meperidine hydrochloride. This compound was found to have an acute toxicity ($LD_{50}$) in mice of 10.2±1.1 mg. per kg. when administered intravenously in aqueous solution.

EXAMPLE 6

*Ethyl 1-(2Carbamylpropyl)-4-Phenylpiperidine-4-Carboxylate Hydrochloride*

This compound was prepared following the procedure described in Example 1 using ethyl 4-phenylpiperidine-4-carboxylate (from 26.9 g. of the hydrochloride) and 8.5 g. of alpha-methylacrylamide. There was thus obtained 16.5 g. of ethyl 1-(2-carbamylpropyl)-4-phenylpiperidine-4-carboxylate hydrochloride, M.P. 201.4–202.6° C. (corr.).

*Analysis.*—Calcd. for $C_{18}H_{26}N_2O_3 \cdot HCl$: $Cl^-$, 9.99; N, 7.90. Found: $Cl^-$, 9.96; N, 7.73.

When tested as described in Example 1, ethyl 1-(2-carbamylpropyl) - 4 - phenylpiperidine-4-carboxylate hydrochloride was found to be approximately one-half as effective an antitussive agent as codeine.

EXAMPLE 7

*Ethyl 1-[2-(N-Methylcarbamyl)ethyl]-4-Phenylpiperidine-4-Carboxylate Hydrochloride*

This compound was prepared following the procedure described in Example 1 using ethyl 4-phenylpiperidine-4-carboxylate (from 25.1 g. of the hydrochloride) and 8 g. of N-methylacrylamide. There was thus obtained 15 g. of ethyl 1-[2-(N-methylcarbamyl)ethyl]-4-phenylpiperidine-4-carboxylate hydrochloride, M.P. 153.2–160.0° C. (corr.) when recrystallized from isopropyl alcohol.

*Analysis.*—Calcd. for $C_{18}H_{26}N_2O_3 \cdot HCl$: $Cl^-$, 9.98; N, 7.89. Found: $Cl^-$, 10.01; N, 7.71.

Pharmacological evaluation of ethyl 1-[2-(n-methylcarbamyl)ethyl]-4-phenylpiperidine-4-carboxylate hydrochloride for antitussive activity by the method described in Example 1 has shown that this compound is approximately one to two times as effective an antitussive agent as codeine. This compound was found to have an acute toxicity ($LD_{50}$) in mice of 55±5 mg. per kg. when administered intravenously in aqueous solution.

EXAMPLE 8

*Ethyl 1-[2-(N,N-Diisopropylcarbamyl)Ethyl]-4-Phenylpiperidine-4-Carboxylate Hydrochloride*

Following the procedure described in Example 1 using 23.5 g. of ethyl 4-phenylpiperidine-4-carboxylate (from 27 g. of the hydrochloride) and 15.6 g. of N,N-diisopropylacrylamide, there was obtained ethyl 1-[2-(N,N-diisopropylcarbamyl)ethyl]-4-phenylpiperidine-4-carboxylate hydrochloride, M.P. 136.8–140.6° C. (corr.).

*Analysis.*—Calcd. for $C_{23}H_{36}N_2O_3 \cdot HCl$: Cl$^-$, 8.34; N, 6.59. Found: Cl$^-$, 8.24; N, 6.54.

When tested as described in Example 1, ethyl 1-[2-(N,N-diisopropylcarbamyl)ethyl]-4-phenylpiperidine-4-carboxylate hydrochloride was found to be approximately as effective an antitussive agent as codeine.

The intermediate N,N-diisopropylacrylamide was prepared as follows: To a solution containing 30 g. of diisopropylamine in 150 cc. of dry benzene, there was added dropwise with stirring at room temperature 27 g. of acrylyl chloride in 75 cc. of benzene. The addition took about thirty minutes and stirring was continued for another ninety minutes maintaining the temperature at about 35–40° C. To the reaction mixture was added 100 cc. of 10% aqueous sodium hydroxide solution and the resulting mixture shaken well. The ether layer was separated, dried over anhydrous sodium sulfate and distilled in vacuo to remove the solvent. The residue was distilled in vacuo to yield 24 g. of N,N-diisopropylacrylamide, B.P. 107° C. at 15 mm.; $n_D^{24}$, 1.4613.

EXAMPLE 9

Methyl 1-(2-Carbamylethyl)-4-Phenylpiperidine-4-Carboxylate Hydrochloride

A 12.9 g. portion of methyl 1-benzyl-4-phenylpiperidine-4-carboxylate dissolved in 200 cc. of absolute ethanol was catalytically reduced using 1 g. of 10% palladium on charcoal as the catalyst. The reduction was carried out using about 50 lbs. pressure of hydrogen at about 50° C. After the theoretical quantity of hydrogen had been taken up, the reaction mixture was filtered and the filtrate was distilled in phenylpiperidine-4-carboxylate which was then taken up in ether and treated with 3.5 g. of acrylamide. The resulting solution was heated on a steam bath first to remove the ether and then heating was continued for an additional hour whereupon the reaction mixture solidified. The solid material was taken up in hot isopropyl alcohol containing a little methanol; and the hot solution was filtered and cooled to yield 10.5 g. of methyl 1-(2-carbamylethyl)-4-phenylpiperidine-4-carboxylate hydrochloride, M.P. 210.2–210·6° C. (corr.) with decomposition.

*Analysis.*—Calcd. for $C_{16}H_{22}N_2O_3 \cdot HCl$: Cl$^-$, 10.95; N, 8.57. Found: Cl$^-$, 10.77; N, 8.93.

EXAMPLE 10

Isopropyl 1-(2-Carbamylethyl)-4-Phenylpiperidine-4-Carboxylate Hydrochloride The intermediate isopropyl 4-phenylpiperidine-4-carboxylate was first prepared as follows: A solution containing 9.8 g. of 1-benzyl-4-phenylpiperidine-4-carboxylic acid in 300 cc. of warm pyridine was cooled in an ice bath and was treated with 11.8 g. of benzenesulfonyl chloride. To this cold solution was added 6 g. of isopropyl alcohol and the resulting solution was kept cold in an ice bath for one hour after addition of the alcohol. Two liters of ice water was added to the reaction mixture and the product that separated was collected, washed with water and recrystallized from ethanol. The solid was then treated with n-pentane, the resulting mixture filtered, and the filtrate evaporated in vacuo to yield 8.2 g. of isopropyl 1-benzyl-4-phenylpiperidine-4-carboxylate, M.P. 74–76° C.

A mixture containing 16.5 g. of isopropyl 1-benzyl-4-phenylpiperidine-4-carboxylate dissolved in 200 cc. of absolute ethanol and 1 g. of 10% palladium on charcoal was treated with 50 lbs. pressure of hydrogen for about twenty hours at a temperature of about 50° C. The reaction mixture was filtered to remove the catalyst and the filtrate was made acidic with a solution of hydrogen chloride in isopropyl alcohol. The solvent was then removed by distilling in vacuo and the residual gummy material was taken up in ethyl acetate. The ethyl acetate solution was distilled in vacuo to remove the solvent and the residue was covered with ether. To this was added 20 cc. of 10% aqueous sodium hydroxide solution and the mixture was shaken thoroughly. The ether layer containing isopropyl 4-phenylpiperidine-4-carboxylate was then separated and treated with 3.5 g. of acrylamide. The resulting reaction mixture was heated to remove the ether and heating was then continued on a steam bath for about three hours. The reaction mixture was taken up in isopropyl alcohol and the resulting solution was treated with a solution of hydrogen chloride in isopropyl alcohol. The resulting precipitate was collected and recrystallized from isopropyl alcohol to give 7.6 g. of isopropyl 1-(2-carbamylethyl)-4-phenylpiperidine-4-carboxylate hydrochloride, M.P. 196.0–197.6° C. (corr.).

*Analysis.*—Calcd. for $C_{18}H_{26}N_2O_3 \cdot HCl$: Cl$^-$, 9.99; N, 7.90. Found: Cl$^-$, 9.98; N, 7.84.

Pharmacological evaluation of isopropyl 1-(2-carbamylethyl)-4-phenylpiperidine-4-carboxylate hydrochloride by the method described in Example 1 has shown that this compound is approximately as effective an antitussive agent as codeine. This compound was found to have an acute toxicity ($LD_{50}$) in rates of $51 \pm 5$ mg. per kg. when administered intravenously in aqueous solution.

EXAMPLE 11

Ethyl 1-(3-Carbamylpropyl)-4-Phenylpiperidine-4-Carboxylate Hydrochloride

To a solution containing ethyl 4-phenylpiperidine-4-carboxylate (from 26.9 g. of its hydrochloride) in 200 cc. of absolute ethanol was added 10 cc. of pyridine and 10.3 g. of 3-cyanopropyl chloride (gamma-chlorobutyronitrile). The resulting solution was refluxed on a steam bath for twelve hours; the solvent was removed by distilling in vacuo; and the residue was taken up in an isopropyl alcohol solution containing hydrogen chloride. The acidic isopropyl alcohol solution was treated with ether whereupon a solid separated. There was thus obtained 10.1 g. of ethyl 1-(3-cyanopropyl)-4-phenylpiperidine-4-carboxylate hydrochloride, M.P. 183–186° C.

*Analysis.*—Calcd. for $C_{18}H_{24}N_2O_2 \cdot HCl$: Cl$^-$, 10.52. Found: Cl$^-$, 10.66.

The 10.1 g. portion of ethyl 1-(3-cyanopropyl)-4-phenylpiperidine-4-carboxylate hydrochloride was treated with dilute aqueous sodium hydroxide solution and extracted with ether. The ether was removed by distilling in vacuo; benzene was added and also distilled off in vacuo. The residue, ethyl 1-(3-cyanopropyl)-4-phenylpiperidine-4-carboxylate in free base form, was dissolved in 50 cc. of concentrated sulfuric acid and allowed to stand for a day. The reaction mixture was then added to ice and water, and the resulting mixture was made alkaline with aqueous sodium hydroxide solution. The mixture was extracted with ether and the ether extract was distilled in vacuo to remove the ether. The residue was dissolved in hot isopropyl alcohol and treated with a solution of hydrogen chloride in isopropyl alcohol. The resulting solution was allowed to cool and ether was added whereupon there separated 6.5 g. of ethyl 1-(3-carbamylpropyl)-4-phenylpiperidine-4-carboxylate hydrochloride, M.P. 186.2–188.4° C. (corr.).

*Analysis.*—Calcd. for $C_{18}H_{26}N_2O_3 \cdot HCl$: Cl$^-$, 9.99; N, 7.90. Found: Cl$^-$, 9.86; N, 7.82.

Pharmacological evaluation of ethyl 1-(3-carbamylpropyl)-4-phenylpiperidine-4-carboxylate hydrochloride by the method described in Example 1 has shown that this compound is approximately one to two times as effective an antitussive agent as codeine. This compound was found to have an acute toxicity ($LD_{50}$) in rats of $75 \pm 5$ mg. per kg. when administered intravenously in aqueous solution.

EXAMPLE 12 n-Butyl 1-(2-Carbamylethyl)-4-Phenylpiperidine-4-Carboxylate Hydrochloride

The intermediate n-butyl 1-benzyl-4-phenylpiperidine-4- carboxylate was prepared as follows: To a chilled solution containing 29.5 g. of 1-benzyl-4-phenylpiperidine-4-carboxylic acid in 900 cc. of pyridine was added with stirring and cooling in an ice bath 35.3 g. of benzenesulfonyl chloride, stirring was continued for another twenty minutes and then 22.2 g. of n-butanol was added. The cold reaction mixture was stirred for an additional ninety minutes and was then poured into about 6 liters of ice water. The aqueous mixture was extracted with n-pentane; the pentane extract was dried over anhydrous sodium sulfate and distilled in vacuo to yield 20 g. of n-butyl 1-benzyl-4-phenylpiperidine-4-carboxylate, M.P. 71–74° C.

A mixture containing 17.5 g. of n-butyl 1-benzyl-4-phenylpiperidine-4-carboxylate, 200 cc. of absolute ethanol and 2 g. of palladium on charcoal was heated to 50° C. and treated with hydrogen under pressure until the uptake of hydrogen ceased. The reaction mixture was filtered and the filtrate treated with hydrogen chloride. The resulting gummy precipitate was covered with ether and the mixture was thoroughly shaken with aqueous sodium hydroxide solution. The ether layer was separated and dried over anhydrous sodium sulfate. This solution, which contained n-butyl 4-phenylpiperidine-4-carboxylate, was treated with 4.2 g. of acrylamide. The ether was removed by distilling in vacuo and the remaining material was heated for about three hours on a steam bath. The reaction mixture was dissolved in hot isopropyl alcohol; a solution of hydrogen chloride in isopropyl alcohol was added; and the precipitate that separated was collected and recrystallized from isopropyl alcohol to yield 8 g. of n-butyl 1-(2-carbamylethyl)-4-phenylpiperidine-4-carboxylate hydrochloride, M.P. 193.2°–194.8° C. (corr.).

Analysis.—Calcd. for $C_{19}H_{28}N_2O_3 \cdot HCl$: Cl⁻, 9.61; C, 61.86; H, 7.64. Found: Cl⁻, 9.47; C, 61.88; H, 7.89.

EXAMPLE 13

*Ethyl 1-[2-(N-Methyl-N-Phenylcarbamyl)Ethyl]-4-Phenylpiperidine-4-Carboxylate Hydrochloride*

The intermediate N-methyl-N-phenylacrylamide was prepared as follows: A solution containing 35 g. of N-methyl-aniline in 100 cc. of benzene was added dropwise to a stirred solution containing 29.6 g. of acrylyl chloride in 200 cc. of benzene kept at 0–5° C. during the addition. The temperature of the reaction mixture was allowed to rise to room temperature and the solid that had separated was filtered off. The filtrate was washed successively with water, cold dilute aqueous hydrochloric acid, cold dilute aqueous sodium hydroxide solution and water. The benzene solution was then distilled in vacuo to remove the solvent. The remaining crystalline product was washed with n-pentane to yield 24 g. of N-methyl-N-phenylacrylamide, M.P. 73–77° C.

A solution containing 5.95 g. of N-methyl-N-phenylacrylamide in 50 cc. of ether was mixed with an ether solution of ethyl 4-phenylpiperidine-4-carboxylate (from 10 g. of the hydrochloride) and the resulting mixture was heated first to remove the ether and then heated on a steam bath for about ten hours. The reaction mixture was then taken up in ether and to the ether solution was added a small quantity of n-pentane whereupon there separated 9.9 g. of ethyl 1-[2-(N-methyl-N-phenylcarbamyl)ethyl]-4-phenylpiperidine-4-carboxylate, M.P. 86–88° C.

Five grams of ethyl 1-[2-(N-methyl - N - phenylcarbamyl)-ethyl]-4-phenylpiperidine - 4 - carboxylate was dissolved in isopropyl alcohol and the resulting solution treated with an equivalent quantity of hydrogen chloride in isopropyl alcohol. When no crystallization resulted even after addition of ether, the solvent was removed in vacuo by distillation and the remaining material treated with dry ether and allowed to stand for about two weeks. The material then had crystallized and was taken up in boiling ethyl acetate containing a trace of methanol. The solution was cooled and the resulting precipitate collected to yield 3.7 g. of ethyl 1-[2-(N-methyl-N-phenylcarbamyl)ethyl] - 4 - phenylpiperidine-4-carboxylate hydrochloride, M.P. 164.0–164.8° C. (corr.).

Analysis.—Calcd. for $C_{24}H_{30}N_2O_3 \cdot HCl$: Cl⁻, 8.24; N, 6.50. Found: Cl⁻, 8.09; N, 6.42.

Ethyl 1-[2-(N-methyl - N - phenylcarbamyl)ethyl]-4-phenylpiperidine - 4 - carboxylate hydrochloride when tested for antitussive activity as described in Example 1 was found to be approximately twice as effective an antitussive agent as codeine. In addition, this compound was found to be approximately seven times as active an analgesic as meperidine hydrochloride when tested in aqueous solution administered subcutaneously by the Rath Thermal Stimulus Method of Bass and Vander Brook.

Other representative lower-alkyl 1-[carbamyl-(polycarbon-lower-alkyl)] - 4-phenylpiperidine-4-carboxylates that can be prepared according to the foregoing procedures using the corresponding lower-alkyl 4-phenylpiperidine-4-carboxylate and appropriate carbamyl-(polycarbon-lower-alkylating) agent are the following compounds of Examples 14–37. These compounds can be isolated in their free base form or in the form of their acid-addition salts, preferably their hydrochlorides, as illustrated.

EXAMPLE 14 n-Hexyl 1-(2-carbamylethyl)-4 - phenylpiperidine - 4-carboxylate hydrochloride is obtained following the procedure described in Example 1 using n-hexyl 4-phenylpiperidine-4-carboxylate and acrylamide.

EXAMPLE 15

Ethyl 1-[2-(N-n-butylcarbamyl)ethyl] - 4 - phenylpiperidine-4-carboxylate hydrochloride is obtained following the procedure described in Example 1 using ethyl 4-phenylpiperidine-4-carboxylate and N - n - butylacrylamide.

EXAMPLE 16

Ethyl 1-[2-(N-n-hexylcarbamyl)ethyl] - 4 - phenylpiperidine-4-carboxylate hydrochloride is obtained following the procedure described in Example 1 using ethyl 4-phenylpiperidine-4-carboxylate and N - n - hexylacrylamide.

EXAMPLE 17

Ethyl 1-[2-(N-ethyl - N - methylcarbamyl)ethyl]-4-phenylpiperidine-4-carboxylate hydrochloride is obtained following the procedure described in Example 1 using ethyl 4-phenylpiperidine-4-carboxylate and N-ethyl - N-methylacrylamide.

EXAMPLE 18

Ethyl 1 - [2 - (N-2-naphthylcarbamyl)ethyl]-4-phenylpiperidine-4-carboxylate hydrochloride is obtained following the procedure described in Example 1 using ethyl 4-phenylpiperidine-4-carboxylate and N - (2-naphthyl)-acrylamide.

EXAMPLE 19

Ethyl 1-[2-(N-2-biphenylylcarbamyl)ethyl]-4 - phenylpiperidine-4-carboxylate hydrochloride is obtained following the procedure described in Example 1 using ethyl 4-phenylpiperidine-4-carboxylate and N - (2-biphenylyl)-acrylamide.

EXAMPLE 20

Ethyl 1-[2-(N-2-furyl - N - methylcarbamyl)ethyl]-4-phenylpiperidine-4-carboxylate hydrochloride is obtained following the procedure described in Example 1 using ethyl 4-phenylpiperidine-4-carboxylate and N - (2-furyl)-N-methylacrylamide.

EXAMPLE 21

Ethyl 1-[2-(N-3-pyridylcarbamyl)ethyl] - 4 - phenylpiperidine-4-carboxylate hydrochloride is obtained following the procedure described in Example 1 using ethyl 4-phenylpiperidine-4-carboxylate and N - (3 - pyridyl)-acrylamide.

EXAMPLE 22

Ethyl 1-[2-(N-2-thienyl-N-n-propylcarbamyl)ethyl]-4-phenylpiperidine-4-carboxylate hydrochloride is obtained following the procedure described in Example 1 using ethyl 4-phenylpiperidine-4-carboxylate and N-(2-thienyl)-N-n-propylacrylamide.

EXAMPLE 23

Eethyl 1-[2-(N-methyl-N-2-pyrimidylcarbamyl)ethyl]-4-phenylpiperidine-4-carboxylate hydrochloride is obtained following the procedure described in Example 1 using ethyl 4-phenylpiperidine - 4 - carboxylate and N-methyl-N-(2-pyrimidyl)acrylamide.

EXAMPLE 24

Ethyl 1 - [2-(N,N-diphenylcarbamyl)ethyl]-4-phenylpiperidine-4-carboxylate hydrochloride is obtained following the procedure described in Example 1 using ethyl 4-phenylpiperidine-4-carboxylate and N,N-diphenylacrylamide.

EXAMPLE 25

Ethyl 1-[2-(N - 4 - chlorophenyl-N-phenylcarbamyl)ethyl]-4-phenylpiperidine-4-carboxylate hydrochloride is obtained following the procedure described in Example 1 using ethyl 4-phenylpiperidine-4-carboxylate and N-(4-chlorophenyl)-N-phenylacrylamide.

EXAMPLE 26

Ethyl 1-[2-(N - 4 - methoxyphenylcarbamyl)ethyl]-4-phenylpiperidine-4-carboxylate hydrochloride is obtained following the procedure described in Example 1 using ethyl 4-phenylpiperidine-4-carboxylate and N - (4-methoxyphenyl)acrylamide.

EXAMPLE 27

Ethyl 1-[2-(N - 4 - chlorophenylcarbamyl)ethyl]-4-phenylpiperidine-4-carboxylate hydrochloride is obtained following the procedure described in Example 1 using ethyl 4-phenylpiperidine-4-carboxylate and N-(4-chlorophenyl)acrylamide.

EXAMPLE 28

Ethyl 1 - [2-(N-3-ethoxyphenyl-N-methylcarbamyl)ethyl]-4-phenylpiperidine-4-carboxylate hydrochloride is obtained following the procedure described in Example 1 using ethyl 4-phenylpiperidine-4-carboxylate and N-(3-ethoxyphenyl)-N-methylacrylamide.

EXAMPLE 29

Ethyl 1-[2-(N - 2 - methylphenylcarbamyl)ethyl]-4-phenylpiperidine-4-carboxylate hydrochloride is obtained following the procedure described in Example 1 using ethyl 4-phenylpiperidine-4-carboxylate and N-(2-methylphenyl)acrylamide.

EXAMPLE 30

Ethyl 1-[2-(N - 2 - chloro-4-ethoxyphenylcarbamyl)ethyl]-4-phenylpiperidine-4-carboxylate hydrochloride is obtained following the procedure described in Example 1 using ethyl 4-phenylpiperidine-4-carboxylate and N-(2-chloro-4-ethoxyphenyl)acrylamide.

EXAMPLE 31

Ethyl 1-[2-(N-3,4,5-trimethoxyphenylcarbamyl)ethyl]-4-phenylpiperidine-4-carboxylate hydrochloride is obtained following the procedure described in Example 1 using ethyl 4-phenylpiperidine-4-carboxylate and N-(3,4,5-trimethoxyphenyl)acrylamide.

EXAMPLE 32

Ethyl 1-[2-(N-4-n-butylaminophenylcarbamyl)ethyl]-4-phenylpiperidine-4-carboxylate hydrochloride is obtained following the procedure described in Example 1 using ethyl 4-phenylpiperidine-4-carboxylate and N-(4-n-butylaminophenyl)acrylamide.

EXAMPLE 33

Ethyl 1 - [2 - (N - 4 - acetylaminophenylcarbamyl)ethyl]-4-phenylpiperidine-4-carboxylate hydrochloride is obtained following the procedure described in Example 1 using ethyl 4-phenylpiperidine-4-carboxylate and N-(4-acetylaminophenyl)acrylamide.

EXAMPLE 34

Ethyl 1 - [2 - (N - 4 - ethylmercaptophenylcarbamyl)ethyl]-4-phenylpiperidine-4-carboxylate hydrochloride is obtained following the procedure described in Example 1 using ethyl 4-phenylpiperidine-4-carboxylate and N-(4-ethylmercaptophenyl)acrylamide.

EXAMPLE 35

Ethyl 1 - [2 - (N - 4 - ethylsulfonylphenylcarbamyl)ethyl]-4-phenylpiperidine-4-carboxylate hydrochloride is obtained following the procedure described in Example 1 using ethyl 4-phenylpiperidine-4-carboxylate and N-(4-ethylsulfonylphenyl)acrylamide.

EXAMPLE 36

Ethyl 1 - [2 - (N - 4 - aminophenyl - N - methylcarbamyl)ethyl]-4-phenylpiperidine-4-carboxylate hydrochloride is obtained following the procedure described in Example 1 using ethyl 4-phenylpiperidine-4-carboxylate and N-(4-aminophenyl)-N-methylacrylamide.

EXAMPLE 37

Ethyl 1-[2-(N-2-thiazolylcarbamyl)ethyl]-4-phenylpiperidine-4-carboxylate hydrochloride is obtained following the procedure described in Example 1 using ethyl 4-phenylpiperidine-4-carboxylate and N-(2-thiazolyl)acrylamide.

EXAMPLE 38

Ethyl 1 - (4-carbamylbutyl)-4-phenylpiperidine-4-carboxylate hydrochloride is obtained following the procedure described in Example 11 first using ethyl 4-phenylpiperidine-4-carboxylate and 4-cyanobutyl chloride and then hydrolyzing the resulting ethyl 1-(4-cyanobutyl)-4-phenylpiperidine-4-carboxylate, and converting the resulting 1-(4-carbamylbutyl) free base into its hydrochloride salt.

The intermediate ethyl 1-(4-cyanobutyl)-4-phenylpiperidine-4-carboxylate was prepared following the procedure described in Example 11 for the preparation of the corresponding 1-(3-cyanopropyl) compound using ethyl 4-phenylpiperidine-4-carboxylate (from 54 g. of its hydrochloride) and 29.2 g. of 4-cyanobutyl chloride (delta-chlorovaleronitrile). There was thus obtained 18 g. of ethyl 1-(4-cyanobutyl)-4-phenylpiperidine-4-carboxylate as its hydrochloride, melting point indefinite (softening at 107.2° C.) when recrystallized from isopropyl alcohol.

*Analysis.*—Calcd. for $C_{19}H_{26}N_2O_2 \cdot HCl$: $Cl^-$, 10.10; N, 7.98. Found: $Cl^-$, 9.95; N, 7.92.

The above hydrochloride salt is converted into its free base in the usual manner as in Example 11 and used in the above-described preparation.

EXAMPLE 39

Ethyl 1-[6-(N-methylcarbamyl)hexyl]-4-phenylpiperidine-4-carboxylate hydrochloride is obtained by reacting ethyl 4-phenylpiperidine-4-carboxylate with 6-(N-methylcarbamyl)hexyl chloride. This preparation can be carried out following the procedure described in Example 11 for the preparation of the corresponding 1-(3-cyanopropyl) compound by reaction of ethyl 4-phenylpiperidine-4-carboxylate with 3-cyanopropyl chloride. When the reaction is run in the absence of pyridine, the hydrochloride salt is obtained directly from the reaction.

Similarly, following the above procedure, using no pyridine and substituting 4-carbamylbutyl bromide or 3-(N-methyl-N-phenylcarbamyl)propyl iodide for 6-(N-methylcarbamyl)hexyl chloride, there is obtained ethyl 1-(4-carbamylbutyl)-4-phenylpiperidine-4-carboxylate hydrobromide or 1-[3-(N-methyl-N-phenyl)propyl]-4-phenylpiperidine-4-carboxylate hydriodide, respectively.

EXAMPLE 40

Ethyl 1-(2-carbamylethyl)-4-phenylpiperidine-4-carboxylate hydrochloride is obtained following, in part, the procedure described in Example 11 first using ethyl 4-phenylpiperidine-4-carboxylate and acrylonitrile and then hydrolyzing the resulting ethyl 1-(2-cyanoethyl)-4-phenylpiperidine-4-carboxylate, and converting the resulting free base into its hydrochloride salt.

The intermediate ethyl 1-(2-cyanoethyl)-4-phenylpiperidine-4-carboxylate was prepared as follows: An ether solution containing ethyl 4-phenylpiperidine-4-carboxylate (from 26.9 g. of its hydrochloride) and 5.3 g. of acrylonitrile was heated under reflux for four and one-half hours on a steam bath. The ether was removed by distilling in vacuo to yield 26 g. of ethyl 1-(2-cyanoethyl)-4-phenylpiperidine-4-carboxylate as an oil. A 5 g. sample of the oil was dissolved in 30 cc. of isopropyl alcohol and a solution of hydrogen chloride in isopropyl alcohol was added. The precipitate was collected, washed with a mixture containing isopropyl alcohol and ether and dried. There was thus obtained 4.7 g. of ethyl 1-(2-cyanoethyl)-4-phenylpiperidine-4-carboxylate hydrochloride, M.P. 200–202.5° C. (corr.).

*Analysis.*—Calcd. for $C_{17}H_{22}N_2O_2 \cdot HCl$: Cl⁻, 10.99; N, 8.68. Found: Cl⁻, 10.93; N, 8.76.

The above hydrochloride salt is converted into its free base in the usual manner as in Example 11 and used in the above-described preparation.

The lower-alkyl 1-[carbamyl-(polycarbon-lower-alkyl)]-4-phenylpiperidine-4-carboxylates of my invention can be formulated in the manner usual for antitussive agents and analgesics. For example, they can be formulated in liquid preparations, e.g., aqueous or aqueous-ethanol menstruum, or in solid form, e.g., tablet or powder. The tablet formulation can be prepared using conventional excipients; and the powder can be formulated in capsule form. These preparations can be administered orally or, in the case of the aqueous preparations of the compounds having analgesic activity, intramuscularly or intravenously. For use as antitussive agents the compounds can be prepared for oral administration as syrups or elixirs by combining the compounds with usual liquid diluents or carriers including, if desired, sweetening and flavoring agents.

I claim:

1. As a composition of matter, lower-alkyl 1-[cyano-(polycarbon - lower - alkyl)] - 4 - phenylpiperidine - 4 - carboxylate.
2. An acid-addition salt of the compound of claim 1.
3. Ethyl 1-(3-cyanopropyl)-4-phenylpiperidine-4-carboxylate.
4. Ethyl 1-(4-cyanobutyl)-4-phenylpiperidine-4-carboxylate.
5. Ethyl 1-(2-cyanoethyl)-4-phenylpiperidine-4-carboxylate.

References Cited in the file of this patent

UNITED STATES PATENTS 2,468,012    Isbell _____ May 19, 1949

OTHER REFERENCES

Whitmore et al.: J. Am. Chem. Soc., volume 66, pages 725 to 731 (1944).

Wagner-Zook: "Synthetic Organic Chemistry," page 591 (1953), John Wiley and Sons.

Millar et al.: "British J. Pharmacol," volume 11, pages 27–31 (1956).

UNITED STATES PATENT OFFICE
CERTIFICATE OF CORRECTION

Patent No. 3,117,128            January 7, 1964

Aram Mooradian

It is hereby certified that error appears in the above numbered patent requiring correction and that the said Letters Patent should read as corrected below.

Column 1, line 10, for "composition" read -- compositions --; line 48, for "term "low-alkyl," as used" read -- term "lower-alkyl," as used --; line 65, for "term "low-aryl," as used" read -- term "lower-aryl," as used --; column 2, line 41, for "methacrylamide 2-methyl-2-propenamide" read -- methacrylamide (2-methyl-2-propenamide --; column 4, line 45, for "Aanalysis", in italics, read -- Analysis --, in italics; column 5, line 2, for "know" read -- known --; lines 62 and 63, for "1-[2-(phenylcarbamyl)" read -- 1-[2-(N-phenylcarbamyl) --; column 6, lines 60 and 61, for "1-[2-(n-methylcarbamyl)" read -- 1-[2-(N-methylcarbamyl) --; column 7, line 34, for "fiitrate" read -- filtrate --; same line 34, after "in" insert -- vacuo to remove the solvent, thereby yielding methyl 4- --; line 44, for "210.2-210-6° C." read -- 210.2-210.6° C. --; column 8, line 22, for "rates" read -- rats --; column 10, line 13, for "Rath" read -- Rat --; column 11, line 9, for "Eethyl" read -- Ethyl --; column 12, line 53, for "al-" read -- alcohol. --.

Signed and sealed this 16th day of June 1964.

(SEAL)
Attest:

ERNEST W. SWIDER

Attesting Officer

EDWARD J. BRENNER

Commissioner of Patents